(12) United States Patent
Hamada et al.

(10) Patent No.: US 7,839,949 B2
(45) Date of Patent: Nov. 23, 2010

(54) PEAK SUPPRESSION METHOD, PEAK SUPPRESSION APPARATUS AND WIRELESS TRANSMISSION APPARATUS

(75) Inventors: Hajime Hamada, Kawasaki (JP); Tokuro Kubo, Kawasaki (JP); Kazuo Nagatani, Kawasaki (JP); Hiroyoshi Ishikawa, Kawasaki (JP); Nobukazu Fudaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 963 days.

(21) Appl. No.: 11/482,618

(22) Filed: Jul. 7, 2006

(65) Prior Publication Data

US 2007/0217543 A1 Sep. 20, 2007

(30) Foreign Application Priority Data

Mar. 17, 2006 (JP) ............................. 2006-075213

(51) Int. Cl.
*H04L 25/03* (2006.01)
(52) U.S. Cl. ...................................................... 375/296
(58) Field of Classification Search ................. 375/295, 375/316, 296
See application file for complete search history.

(56) References Cited

U.S. PATENT DOCUMENTS

| | | | | |
|---|---|---|---|---|
| 5,287,387 A * | 2/1994 | Birchler | ...................... | 375/296 |
| 5,621,762 A * | 4/1997 | Miller et al. | ................. | 375/298 |
| 5,638,403 A * | 6/1997 | Birchler et al. | ............. | 375/296 |
| 5,727,026 A * | 3/1998 | Beukema | ..................... | 375/296 |
| 5,978,421 A * | 11/1999 | Shoji | .......................... | 375/297 |
| 6,075,411 A * | 6/2000 | Briffa et al. | ................. | 330/149 |
| 6,130,918 A * | 10/2000 | Humphrey et al. | ........... | 375/295 |
| 6,175,270 B1 * | 1/2001 | Vannucci | ........................ | 330/2 |
| 6,175,551 B1 * | 1/2001 | Awater et al. | ................ | 370/210 |
| 6,175,602 B1 * | 1/2001 | Gustafsson et al. | ......... | 375/346 |
| 6,236,864 B1 * | 5/2001 | McGowan et al. | ........... | 455/522 |
| 6,356,606 B1 * | 3/2002 | Hahm | ......................... | 375/350 |
| 6,407,634 B1 * | 6/2002 | Staudinger et al. | .......... | 330/149 |
| 6,504,862 B1 * | 1/2003 | Yang | .......................... | 375/146 |
| 6,522,869 B1 * | 2/2003 | Hiramatsu et al. | ........ | 455/127.2 |
| 6,687,511 B2 * | 2/2004 | McGowan et al. | ........... | 455/522 |
| 6,741,661 B2 * | 5/2004 | Wheatley et al. | ............ | 375/296 |
| 6,885,850 B2 * | 4/2005 | Kobayashi et al. | ........ | 455/115.1 |
| 6,891,902 B2 * | 5/2005 | Talwar et al. | ................ | 375/296 |
| 6,931,053 B2 * | 8/2005 | McGowan | ................... | 375/146 |
| 6,931,079 B1 * | 8/2005 | Peeters | ........................ | 375/296 |
| 6,931,239 B2 * | 8/2005 | Hongo et al. | ................ | 455/103 |
| 6,983,026 B2 * | 1/2006 | Pinckley et al. | ............. | 375/296 |
| 7,006,558 B2 * | 2/2006 | Boloorian | .................... | 375/150 |

(Continued)

FOREIGN PATENT DOCUMENTS

EP          1 717 979          11/2006

(Continued)

OTHER PUBLICATIONS

European Search Report dated Jun. 28, 2007, from the corresponding European Application.

*Primary Examiner*—Temesghen Ghebretinsae
(74) *Attorney, Agent, or Firm*—Katten Muchin Rosenman LLP

(57) ABSTRACT

The present invention provides a peak suppression method, including a first step for detecting characteristic information of a peak part of a transmission signal; and a second step for changing a suppression method for the peak part based on the characteristic information.

16 Claims, 20 Drawing Sheets

U.S. PATENT DOCUMENTS

| | | | |
|---|---|---|---|
| 7,013,161 B2* | 3/2006 | Morris | 455/522 |
| 7,042,287 B2* | 5/2006 | Robinson | 330/149 |
| 7,095,798 B2* | 8/2006 | Hunton | 375/296 |
| 7,123,644 B2* | 10/2006 | Park et al. | 375/146 |
| 7,151,759 B1* | 12/2006 | Ryan et al. | 370/332 |
| 7,170,952 B2* | 1/2007 | Hunton | 375/296 |
| 7,251,463 B2* | 7/2007 | McCallister | 455/114.2 |
| 7,266,354 B2* | 9/2007 | Jian et al. | 455/245.2 |
| 7,274,914 B2* | 9/2007 | Ohba et al. | 455/104 |
| 7,295,816 B2* | 11/2007 | McCallister | 455/114.2 |
| 7,340,004 B2* | 3/2008 | Vuopala et al. | 375/295 |
| 7,349,817 B2* | 3/2008 | Cha | 702/66 |
| 7,353,127 B2* | 4/2008 | Navakatikyan et al. | 702/79 |
| 7,369,580 B2* | 5/2008 | Iwasaki | 370/533 |
| 7,409,009 B2* | 8/2008 | Akhtman | 375/296 |
| 7,409,617 B2* | 8/2008 | Almy et al. | 714/738 |
| 7,480,234 B1* | 1/2009 | Hart et al. | 370/208 |
| 2001/0001007 A1* | 5/2001 | Polley et al. | 375/254 |
| 2001/0054931 A1* | 12/2001 | Bar-David | 330/10 |
| 2002/0012403 A1* | 1/2002 | McGowan et al. | 375/295 |
| 2002/0061068 A1* | 5/2002 | Leva et al. | 375/260 |
| 2002/0101937 A1* | 8/2002 | Antonio et al. | 375/297 |
| 2002/0176480 A1* | 11/2002 | Wheatley et al. | 375/130 |
| 2002/0181610 A1* | 12/2002 | Sumasu et al. | 375/296 |
| 2002/0191705 A1* | 12/2002 | Melsa et al. | 375/295 |
| 2003/0022639 A1* | 1/2003 | Hongo et al. | 455/116 |
| 2003/0067990 A1* | 4/2003 | Bryant | 375/259 |
| 2003/0067995 A1* | 4/2003 | Matsuoka et al. | 375/296 |
| 2003/0086507 A1* | 5/2003 | Kim et al. | 375/297 |
| 2004/0005014 A1* | 1/2004 | Talwar et al. | 375/295 |
| 2004/0203430 A1* | 10/2004 | Morris | 455/67.11 |
| 2004/0218689 A1* | 11/2004 | Akhtman | 375/296 |
| 2006/0133524 A1* | 6/2006 | Hamada et al. | 375/260 |
| 2007/0178853 A1* | 8/2007 | Hamada et al. | 455/103 |
| 2007/0188218 A1* | 8/2007 | Ueda | 327/551 |
| 2008/0013646 A1* | 1/2008 | Hamada et al. | 375/297 |

FOREIGN PATENT DOCUMENTS

| | | |
|---|---|---|
| JP | 2005-20505 | 1/2005 |
| WO | 2005/091538 | 9/2005 |

* cited by examiner

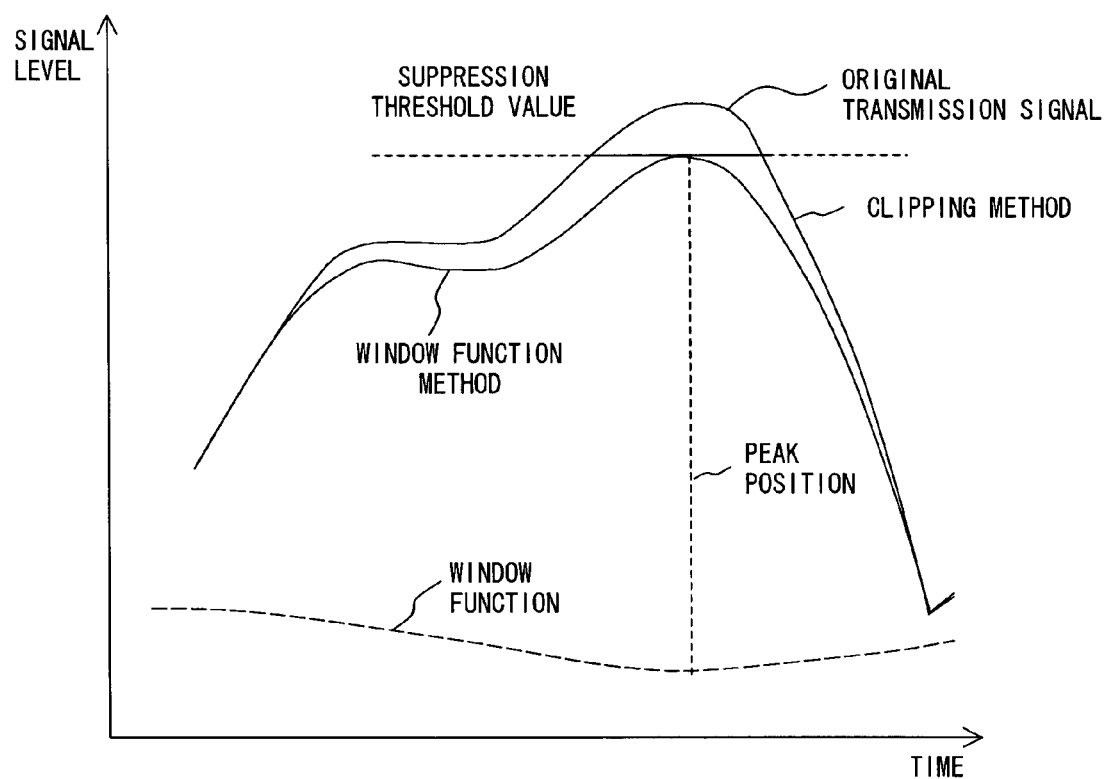
F I G. 1

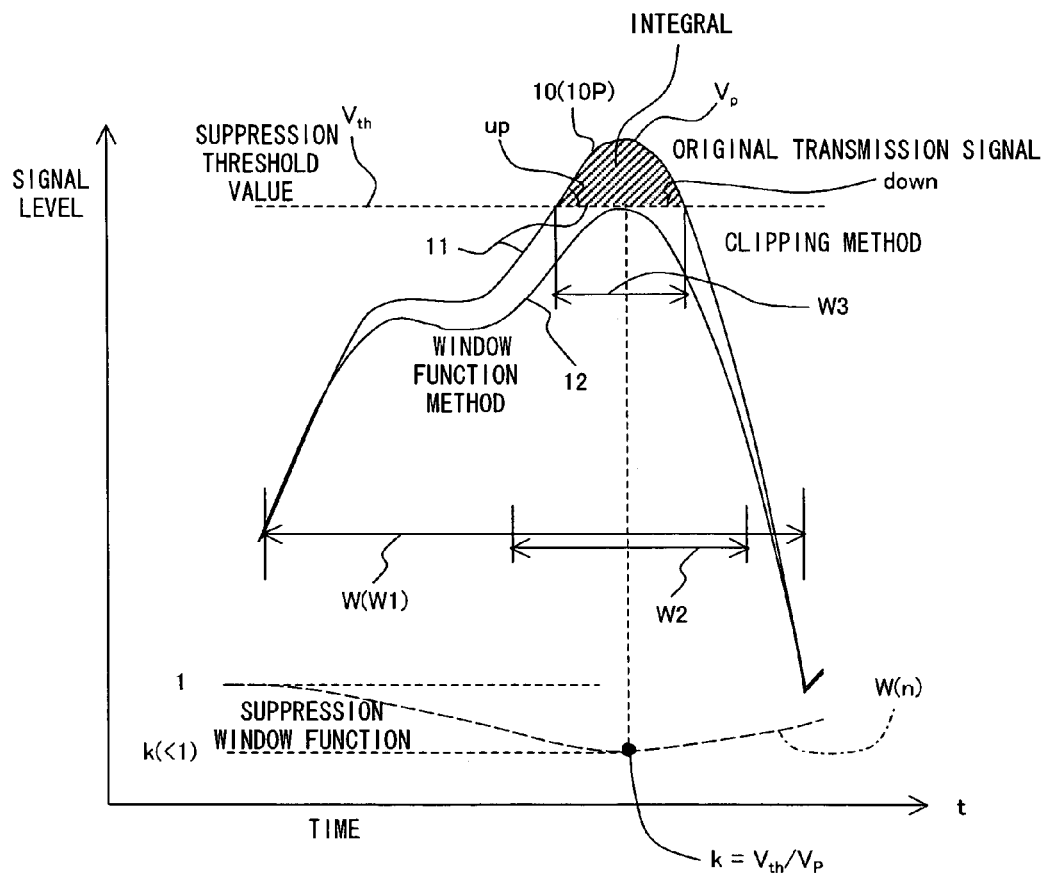
F I G. 4

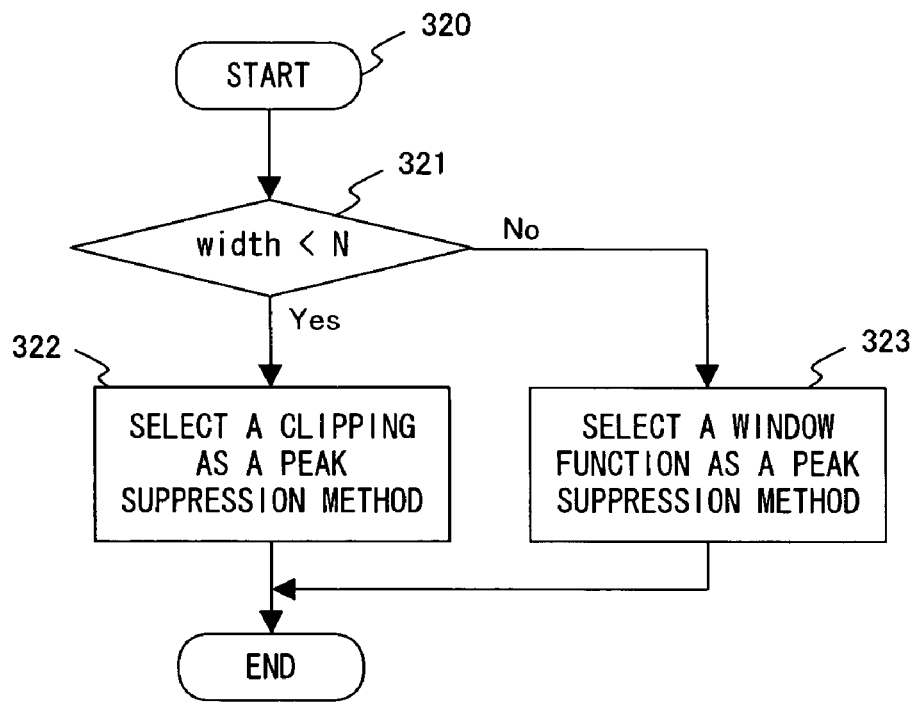
F I G. 8

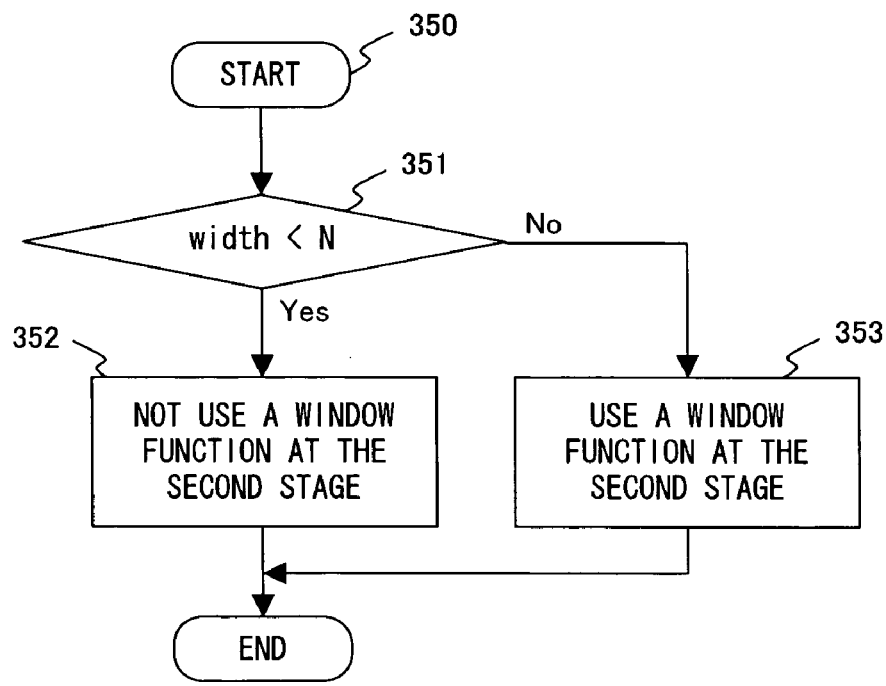
F I G. 1 7

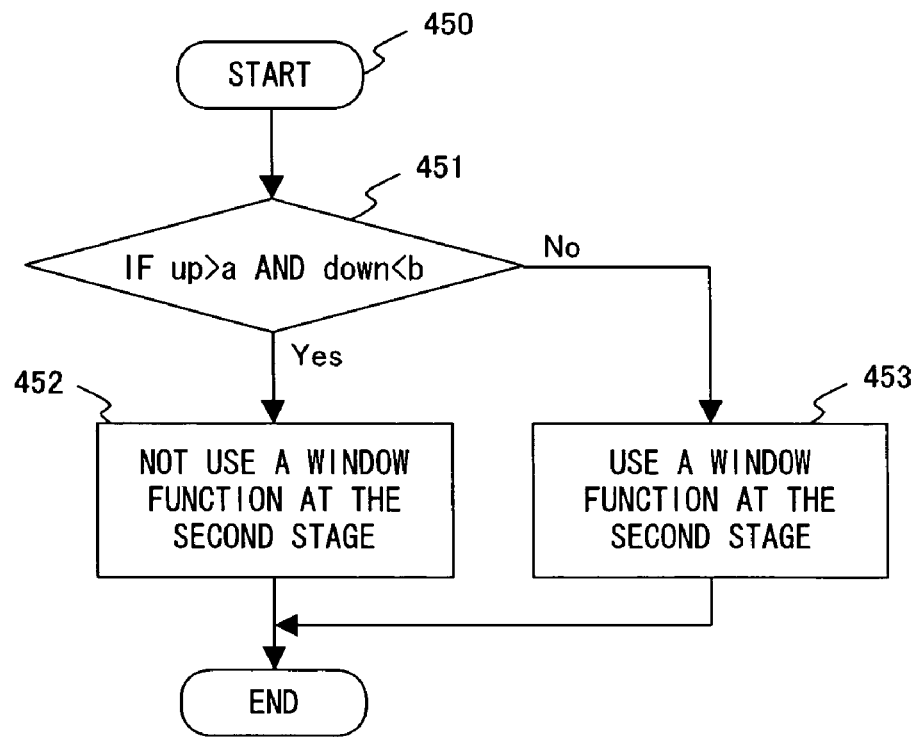
F I G. 1 8

PEAK SUPPRESSION METHOD, PEAK SUPPRESSION APPARATUS AND WIRELESS TRANSMISSION APPARATUS

BACKGROUND OF THE INVENTION

1. Field of the Invention

The present invention relates to a peak suppression technique, and to a technique effectively applicable to a peak suppression technique, et cetera, for an input signal to a transmission amplifier for use in a digital wireless telecommunication, et cetera for example.

2. Description of the Related Art

A linear amplification is required to a transmission amplifier for use in the currently practiced major digital wireless telecommunication systems.

Meanwhile, in a multi-carrier telecommunication system such as the Orthogonal Frequency Division Multiple Access (OFDM) system, a known fact is that a high peak power is often generated at the time of synthesizing a transmission signal.

Generally, as a Peak-to-Average Power Ratio (PAPR) becomes large, a back-off power of a transmission amplifier needs to be large so as to operate it in a linear range, resulting in degrading an efficiency of the transmission amplifier.

In order to prevent it, various peak suppression techniques have been proposed for suppressing a peak component relating to a transmission signal input from a digital signal generation unit to a digital-to-analog (D/A) conversion unit at a front stage of a wireless transmission unit.

Conventional known peak suppression techniques include a clipping method limiting the maximum value of a peak wave form to a suppressed threshold value or smaller, and a window function method multiplying a coefficient so that the maximum value of a peak wave form is suppressed to a suppression threshold value or smaller.

FIG. 1 is a graph showing how a time signal is suppressed in the case of applying each of the peak suppression techniques to a transmission signal, with the horizontal axis indicating time and the vertical axis indicating voltage. FIG. 2 is a graph showing how a spectrum appears in each of the cases of the original time signal, clipping method and window function method, with the horizontal axis indicating frequency and the vertical axis indicating power.

In the above described clipping method, only the necessary minimum transmission signal is suppressed so as to shave off a part exceeding a suppression threshold value and therefore the shaved off signal is a small portion, thereby making a small degradation of a reception characteristic. On the other hand, high frequency components are generated because the ends of the suppression are not smooth, thereby degrading a spectrum characteristic (i.e., a distortion characteristic). For preventing this, a common method is a parallel use of a low pass filter (LPF) which, however, is faced with a technical problem of increasing a circuit size for including the LPF and of reproducing the once clipped peak as a result of the filtering.

Meanwhile, a window function method suppresses a peak by multiplying it by a coefficient whose distribution is defined by the window function as shown by FIG. 1. In this case, a degradation of a spectrum characteristic is comparably smaller than the case of only using the clipping method because the ends of a suppression range can be relatively smoother, which, however, requires a multiplication of a window having a long time-width to some extent by an original signal, resulting in cutting that much signal off the original signal and an accordingly great degradation of the reception characteristic.

As far as using each of these methods independently, the relationship of a reception characteristic and a degradation of a spectrum becomes a subject of trading off and therefore what is demanded is a method for adequately adjusting the balance between the aforementioned two aspects suitably to a system to be applied to.

A patent document 1 has disclosed a technique for generating a peak factor corresponding to a ratio of a transmission target signal level threshold value to a peak level of a transmission target signal in order to judge the peak of the transmission target signal and multiplying a result of weighting the peak factor by a predefined window function, as a peak suppression coefficient, by the level of the transmission target signal together, thereby suppressing the peak.

The technique disclosed by the patent document 1, using only the window function for carrying out the suppression, cannot solve the above described technical problem which is specific to the window function.

[Patent document 1] Laid-Open Japanese Patent Application Publication No. 2005-20505

SUMMARY OF THE INVENTION

A purpose of the present invention is to provide a peak suppression technique capable of reducing an output back-off of a transmission amplifier by minimizing a Peak-to-Average Power ratio (PAPR) of a transmission signal, thereby improving amplification efficiency.

Another purpose of the present invention is to provide a peak suppression technique capable of minimizing a Peak-to-Average Power ratio (PAPR) of a transmission signal while effectively adjusting a balance between a degradation of a reception characteristic and a degradation of a distortion characteristic due to the peak suppression.

Yet another purpose of the present invention is to provide a peak suppression technique capable of accomplishing an optimization of a balance between a reception characteristic and a distortion characteristic in a peak suppression signal of a transmission signal responding to characteristics of the aforementioned transmission signal generated by various modulation methods used for a wireless telecommunication apparatus.

A first aspect of the present invention is to provide a peak suppression method, including a first step for detecting characteristic information of a peak part of a transmission signal; and a second step for changing a suppression method for the peak part based on the characteristic information.

A second aspect of the present invention is to provide a peak suppression apparatus, comprising a peak detection unit for detecting characteristic information of a peak part of a transmission signal; and a peak suppression control unit for changing a suppression method for the peak part based on the characteristic information.

A third aspect of the present invention is to provide a wireless transmission apparatus, including a transmission signal generation unit for generating a transmission signal; a peak suppression unit for suppressing a peak part of the transmission signal; an amplifier unit for amplifying the transmission signal whose peak has been suppressed; and a wireless transmission unit for converting the transmission signal to a radio frequency, wherein the peak suppression unit includes a peak detection unit for detecting characteristic information of a peak part of a transmission signal, and a peak suppression control unit for changing a suppression method for the peak part based on the characteristic information.

The present invention adaptively changes over suppression methods between a window method and a clipping method based on characteristic information obtained from a peak part of a transmission signal, thereby obtaining a superior suppression characteristic from each aspect of a reception characteristic and a spectrum characteristic.

That is, the present invention dynamically changes over suppression methods for a peak part by focusing on the characteristic information such as a time-wise expanse of the peak part of a transmission signal. The present invention also judges whether or not to apply a plurality of a single suppression method or of different suppression methods in multiple stages to a peak part, and adaptively controls a combination of multiply applied suppression method(s).

This contrivance makes it possible to have a balance between a reception characteristic and a distortion characteristic approach the most optimal point.

An application of the present invention to a peak part of a transmission signal used for a digital wireless telecommunication, et cetera, makes it possible to minimize a Peak-to-Average Power ratio (PAPR) of an input signal to a transmission amplifier, reduce an output back-off thereof and improve amplification efficiency.

The present invention further makes it possible to accomplish an optimization of a balance between a reception characteristic and a distortion characteristic in a peak suppressed signal of a transmission signal responding to characteristics of transmission signals provided by various modulation methods used for a wireless telecommunication apparatus.

BRIEF DESCRIPTION OF THE DRAWINGS

FIG. 1 is a graph showing how a time signal is suppressed in the case of applying each of a clipping suppression method and a window function method to a transmission signal;

FIG. 4 is a graph exemplifying an operation of a configuration of a peak suppression apparatus embodying a peak suppression method according to an embodiment of the present invention;

FIG. 8 is a flow chart exemplifying an operation of a suppression method selection unit in the peak suppression apparatus exemplified in FIG. 3;

FIG. 17 is a flow chart exemplifying an operation of a suppression method selection unit in the peak suppression apparatus exemplified in FIG. 16;

FIG. 18 is a flow chart exemplifying an operation of a suppression method selection unit in the peak suppression apparatus exemplified in FIG. 16;

DESCRIPTION OF THE PREFERRED EMBODIMENTS

The following is a detailed description of the preferred embodiment of the present invention by referring to the accompanying drawings.

First Embodiment

The first description is of the case of changing over between a window function method and a clipping suppression method.

Figure 2:
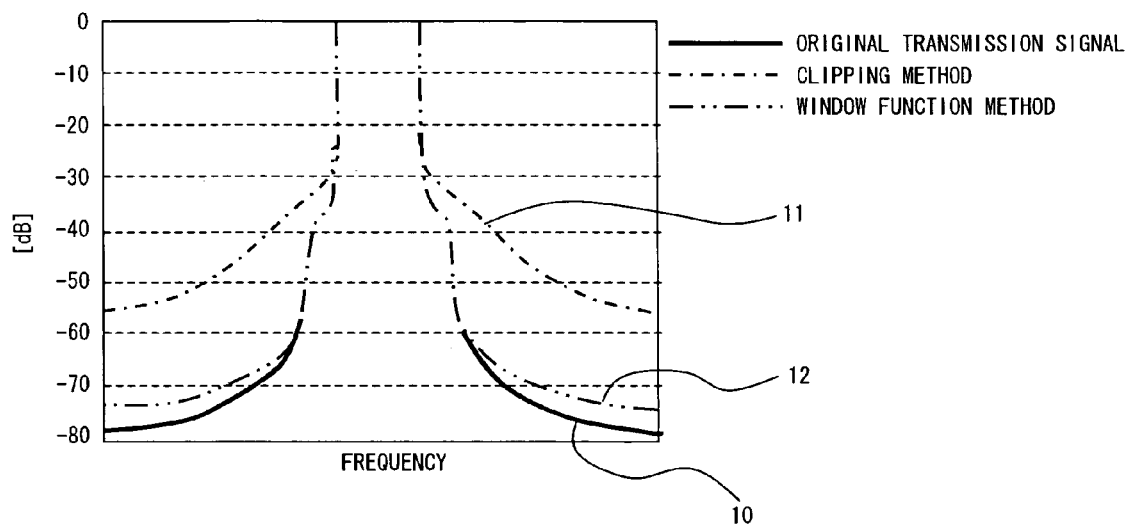
FIG. 2 is a graph showing how a spectrum appears in each of the cases of an original time signal, a clipping method and a window function method.
Figure 3:
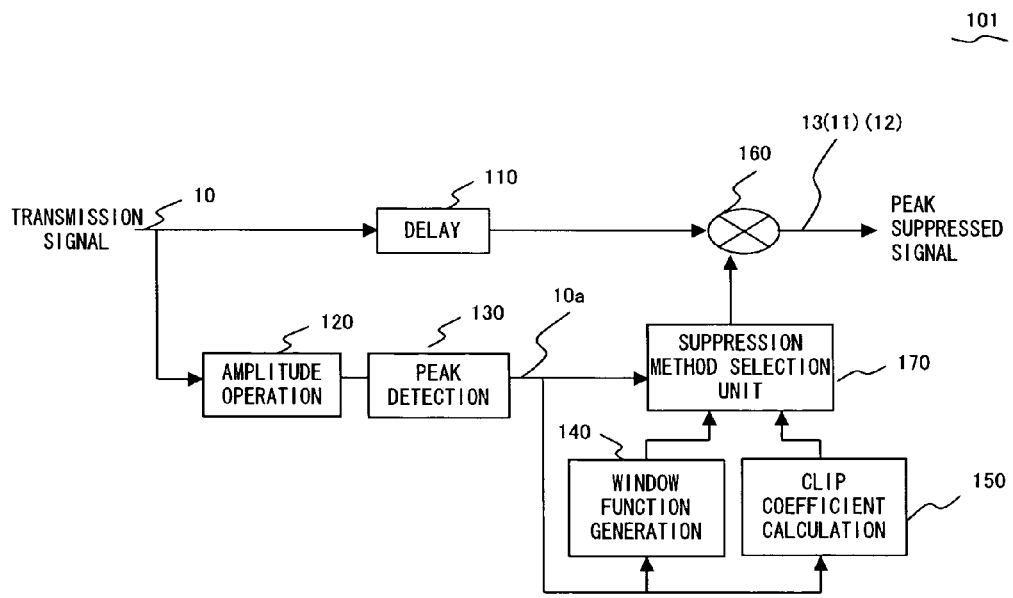
FIG. 3 is a conceptual diagram exemplifying a configuration of a peak suppression apparatus embodying a peak suppression method according to an embodiment of the present invention.

FIG. 3 is a conceptual diagram exemplifying a configuration of a peak suppression apparatus embodying a peak suppression method according to an embodiment of the present invention.

FIG. 4 is a graph exemplifying an operation of a configuration of a peak suppression apparatus embodying a peak suppression method according to an embodiment of the present invention.

The peak suppression apparatus 101 according to the present embodiment includes a delay buffer 110, an amplitude operation unit 120, a peak detection unit 130, a window function generation unit 140, a clip coefficient calculation unit 150, a multiplication unit 160 and a suppression method selection unit 170.

A transmission signal 10 is branched and input to the delay buffer 110 and amplitude operation unit 120. The delay buffer 110 inputs, to the multiplication unit 160, the transmission signal 10 by delaying it by a length of a judgment time of a later described peak suppression processing.

The amplitude operation unit 120 detects a waveform of the transmission signal 10, for example, by dispersively detecting an amplitude value thereof at a prescribed sampling interval Δt.

The peak detection unit 130 detects the maximum value (Vp) and its sampling position in the direction of the time axis of the peak part 10p, and the following characteristic information 10a, of the transmission signal 10 from a distribution of amplitude values obtained by the amplitude operation unit 120 at the previous stage.

The present embodiment is configured to detect the following information as characteristic information 10a as exemplified in FIG. 4.

That is, a first is a length of the part (i.e., a peak width; N.B.: the second "width" is an attached component sign herein) where the peak part 10p exceeds a predefined suppression threshold value Vth.

A second is an inclination at the point where the peak part 10p crosses the suppression threshold value Vth upward (i.e., an inclination of a rise up; N.B.: the "up" is an attached component sign herein) and an inclination when it crosses downward (i.e., an inclination of a fall down; N.B.: the "down" is an attached component sign herein).

A third is an area of a zone (i.e., an integral of amplitudes integral; N.B.: the second "integral" is an attached component sign herein) where the peak part 10p exceeds the suppression threshold value Vth.

The window function generation unit 140 generates a window function for implementing the window function method, that is, generates a window function w(n) providing a coefficient k having an appropriate distribution for lowering the entirety of the level of the peak part 10p so that a part of the maximum value (Vp) of the peak part 10p becomes the suppression threshold value Vth based on the above described characteristic information 10a.

A k=w(n) corresponding to "n" at the position of the maximum peak level Vp is given by the expression k=Vth/Vp.

The window function can use a discretionary one such as Hanning Window, Hamming Window, Kaiser Window, Blackman Window.

The clip coefficient calculation unit 150 calculates a coefficient distribution for implementing a clipping suppression method, that is, generates the coefficients having an appropriate distribution so that the zone where the peak part 10p exceeds a suppression threshold value Vth is equal to the aforementioned suppression threshold value Vth while the original signal level is maintained in the other parts.

The suppression method selection unit 170 performs an operation for dynamically selecting an output of the window function generation unit 140 or clip coefficient calculation unit 150, and inputting it to the multiplication unit 160 based on the characteristic information 10a.

If the clip coefficient calculation unit 150 is selected, a clip suppression signal 11 is output as a peak suppressed signal 13 from the multiplication unit 160, while if the window function generation unit 140 is selected, a window function suppression signal 12 is output as a peak suppressed signal 13 from the multiplication unit 160.

That is, the suppression method selection unit 170 dynamically changes over between the window function method and clipping method based on the characteristic information 10a of the peak part 10p, thereby controlling a balance between a spectrum characteristic (i.e., a distortion characteristic) and a reception characteristic as shown in FIG. 3.

Algorithms used for making a selection at the suppression method selection unit 170 shown in FIG. 3 based on the characteristic information 10a obtained from the peak detection unit 130 are shown in the forms of flow charts in FIGS. 5, 6 and 7, and 8, 9 and 10.

Figure 5:
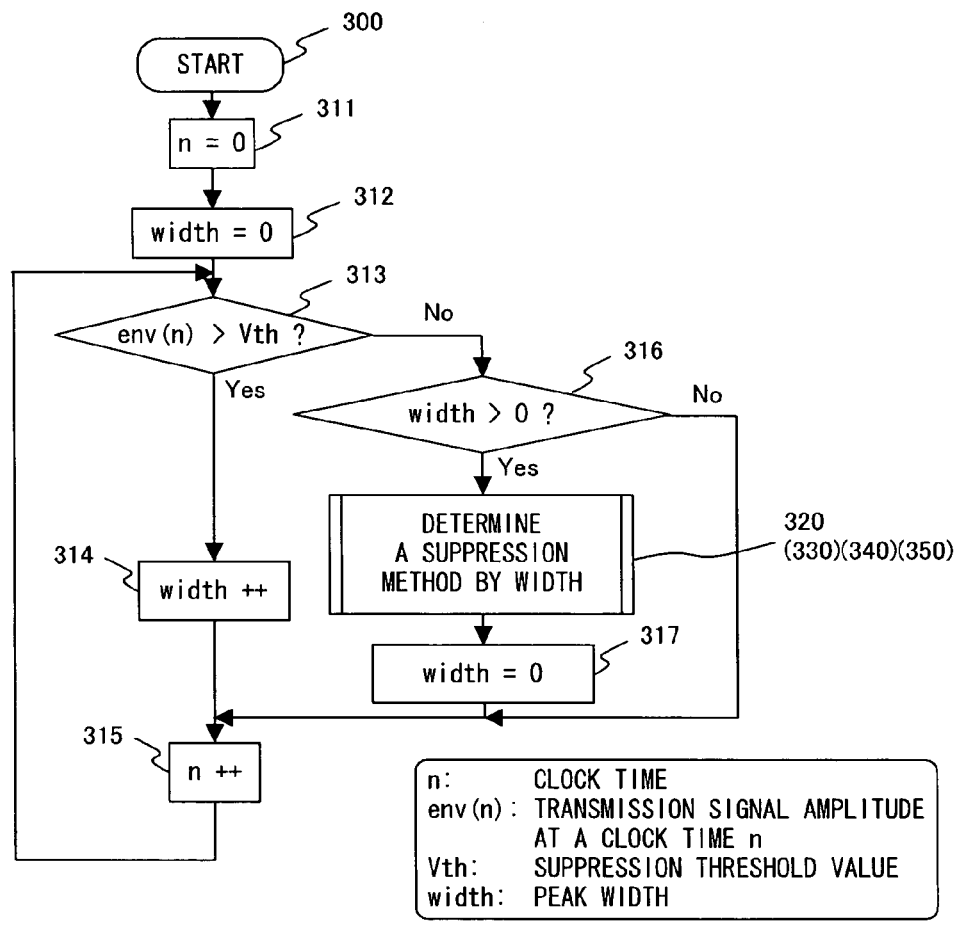
FIG. 5 is a flow chart exemplifying an operation of a peak suppression method and a peak suppression apparatus according to an embodiment of the present invention.

FIG. 5 shows a peak suppression process 300 for changing over the suppression methods for the peak part 10p according to a length of the peak part, which measures a length of time (i.e., a peak width) where the amplitude exceeds a predetermined threshold value Vth and changes over the suppression methods based the measured data.

That is, the process 300 initializes a clock time n to "0" as a pointer indicating a sampling position (i.e., a sampling interval Δt) of an amplitude value env(n) of a transmission signal 10 (step 311) and initializes also a peak width to "0" (step 312).

Then the process 300 judges whether or not the amplitude value env(n) exceeds the suppression threshold value Vth (step 313) and, if it exceeds, increments the peak width (step 314) and also the clock time n (step 315), followed by returning to the step 313.

If the judgment in step 313 is that the amplitude value env (n) does not exceed the suppression threshold value Vth, the process 300 judges whether or not the peak width is greater than "0" (step 316) and, if the width is equal to or less than "0", increments the clock time n (step 315), followed by shifting the step 313.

If the peak width is judged to be greater than "0" in the step 316, the process 300 carries out a suppression method determination process (step 320), followed by (step 316) initializing the width to "0" (step 317), incrementing the clock time n (step 315) and shifting to a detection process of a peak width of the next peak part 10p.

FIG. 8 shows a flow chart exemplifying a selection process of a suppression method in the step 320.

That is, if a peak width is smaller than N (of a predefined constant) (step 321), the process 300 selects the clipping suppression method as a peak suppression method (step 322), otherwise selects the window function method as a peak suppression method (step 323).

In the case of FIG. 8, a use of the window function for a peak part 10p whose peak width is small degrades a reception characteristic, and therefore the clipping suppression method is used for suppressing a peak part 10p shorter than N (where the N is a predefined constant).

Figure 6:
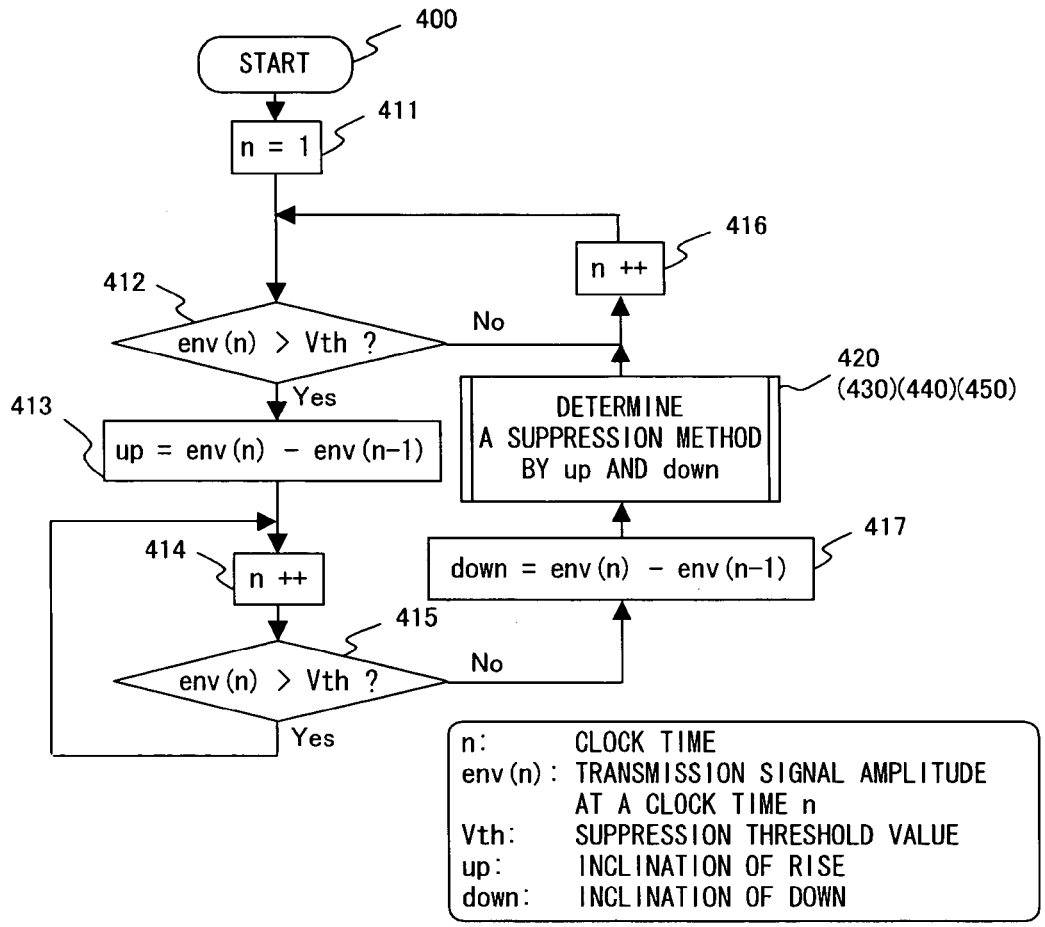
FIG. 6 is a flow chart exemplifying an operation of a peak suppression method and a peak suppression apparatus according to an embodiment of the present invention.

FIG. 6 shows a peak suppression method 400 for changing over suppression methods based on an inclination of a part where a transmission signal amplitude crosses with a threshold value Vth, with a judgment for changing over the suppression method using the prediction that the larger the inclinations of the rise (i.e., up) and fall (i.e., down) the steeper the peak is indicated and also the size of the peak is larger than the width thereof.

That is, the peak suppression method 400 initializes a clock time n to "1" (step 411), while discerns whether an amplitude value env(n) of the transmission signal 10 at a clock time n exceeds a suppression threshold value Vth (step 412), increments the clock time n (step 416).

If the amplitude value env(n) exceeds the suppression threshold value Vth in the step 412, meaning that the rise part of the peak part 10p crosses the suppression threshold value Vth, the method 400 accordingly calculates an inclination of the rise by the expression: up (=env(n)−env(n−1)) (step 413).

Note that the expression "env(n)−env(n−1)" in the step 413 is a value indicating a change in signal levels, that is, an inclination, in between a predefined sampling interval Δt.

Then, while discerning whether an amplitude value env (n) of the transmission signal at a clock time n exceeds the suppression threshold value Vth (step 415), the method 400 increments the clock n (step 414).

If the amplitude value env(n) falls below the suppression threshold value Vth ("no" for the judgment in the step 415), meaning that the fall part of the peak part 10p has crossed the suppression threshold value Vth, it calculates an inclination of the fall down (step 417). This "down" indicates an inclination likewise the "up", except that the former is a negative value.

Then, it determines a suppression method based on the values of the up and down respectively obtained in the steps 413 and 417 (step 420).

Figure 9:
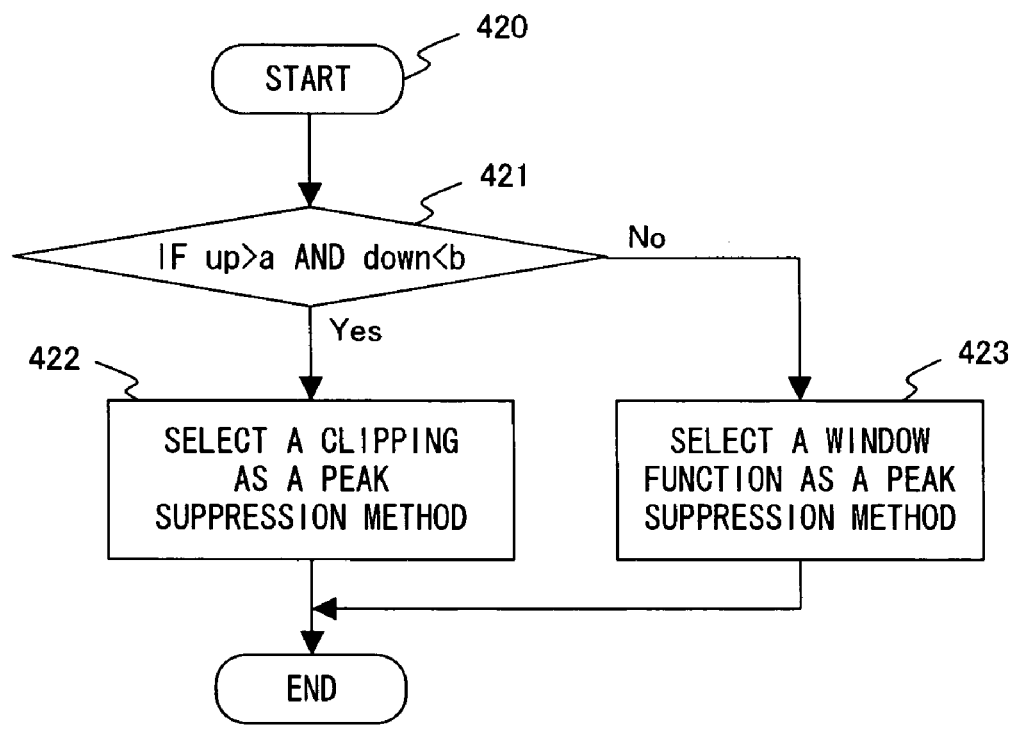
FIG. 9 is a flow chart exemplifying an operation of a suppression method selection unit in the peak suppression apparatus exemplified in FIG. 3.

FIG. 9 is a flow chart exemplifying a judgment in the step 420 shown in FIG. 6.

That is, if the expressions: up>a, and down<b (i.e., negative value) are both valid (step 421), the peak suppression method 400 selects the clipping suppression method as a peak suppression method (step 422), otherwise selects a window function method as a peak suppression method (step 423).

In the case of FIG. 9, if a peak having a larger amplitude as compared to a time width is suppressed by using the window function, a reception characteristic is degraded as a result of parts other than the peak being greatly shaved off, and therefore such a peak is suppressed by the clipping method.

Figure 7:
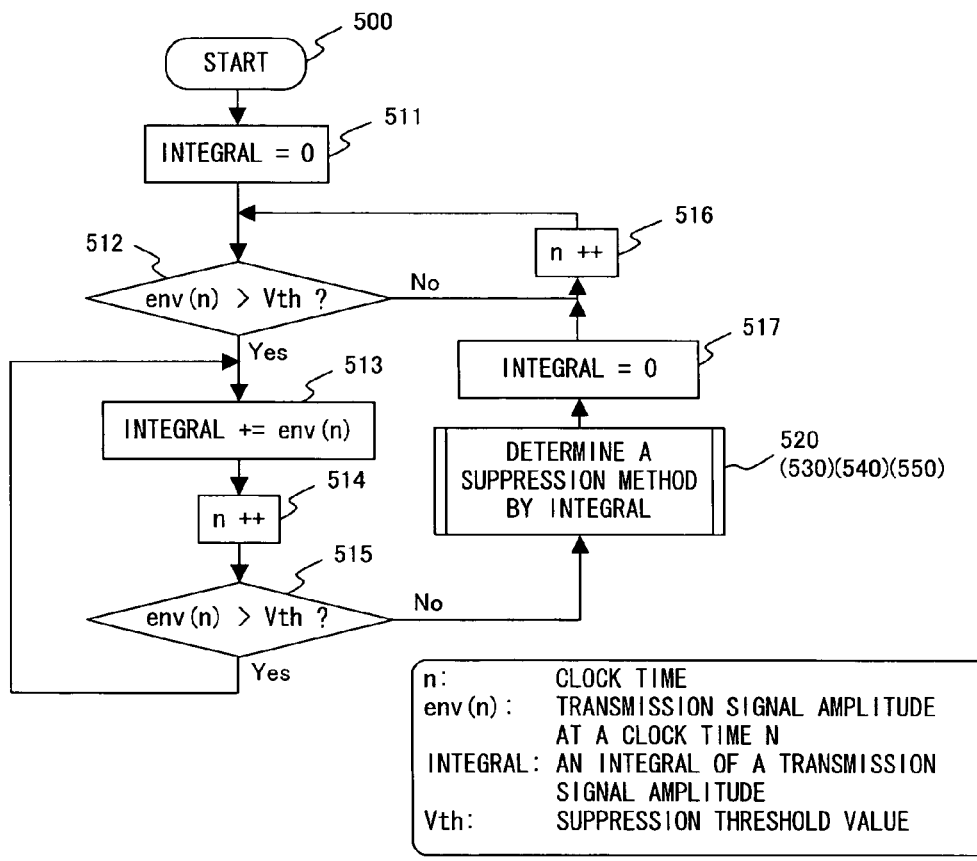
FIG. 7 is a flow chart exemplifying an operation of a peak suppression method and a peak suppression apparatus according to an embodiment of the present invention.

FIG. 7 is a flow chart exemplifying a peak suppression method 500 changing over suppression methods by an integral of a signal amplitude (or may be a power) of a peak part, integrating an amplitude value during a time the amplitude of the peak part 10p exceeding a predetermined threshold value Vth. The fact of an integral integral being large means that the signal shave off by suppression increases that much, and therefore the fact is utilized.

That is, after initializing an integral integral of an amplitude to "0" (step 511), while discerning whether or not an amplitude value env(n) of the transmission signal 10 at a clock time n exceeds a suppression threshold value Vth (step 512), the peak suppression method 500 increments a clock time n (step 516).

Then, if the expression: env(n)>Vth is valid in the step 512, presumably entering a zone in which the peak part 10p exceeds the suppression threshold value Vth, and therefore it adds an env(n) to the integral (step 513), followed by repeating the process of incrementing a clock time n (step 514) until the expression env(n)<Vth becomes valid (step 515).

The peak suppression method 500 determines a peak suppression method based on the thus obtained integral integral of the amplitude (step 520).

Figure 10:
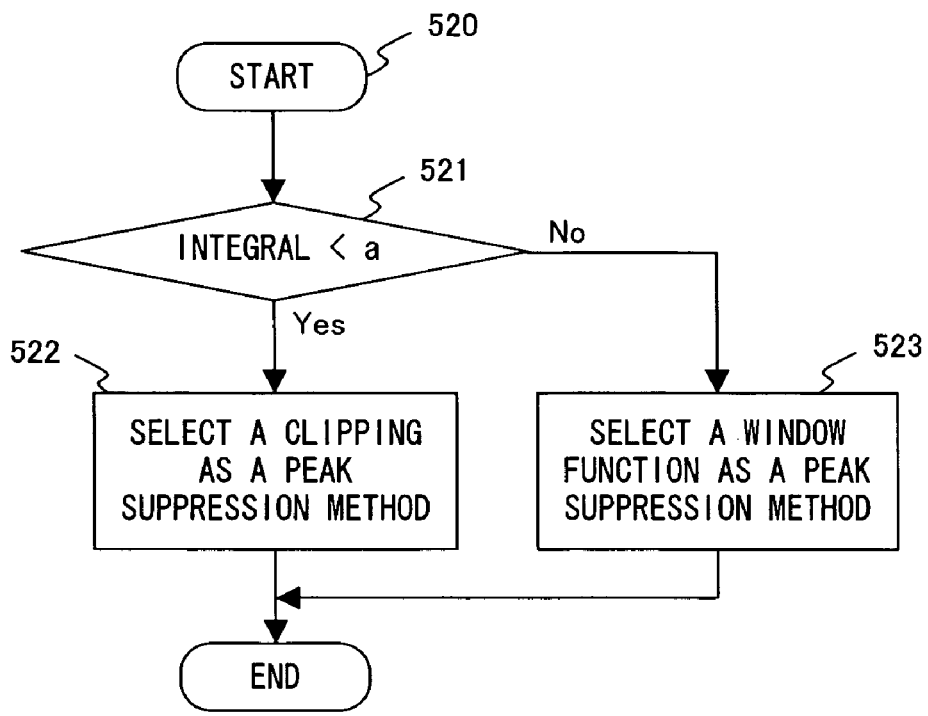
FIG. 10 is a flow chart exemplifying an operation of a suppression method selection unit in the peak suppression apparatus exemplified in FIG. 3.

FIG. 10 is a flow chart exemplifying a determination method in the step 520.

That is, if the integral is smaller than a predefined constant "a", the peak suppression method 500 selects the clipping suppression method (step 522), otherwise selects the window function suppression method (step 523).

In the case of a judgment shown in FIG. 10, the fact of an integral integral of an amplitude being large means that a use of the clipping method greatly degrades a spectrum characteristic, and therefore the window function is used for such a case.

Table 1 summarily shows judgment criteria for selecting a peak suppression method in the steps 320, 420 and 520 in the respective algorithms shown in FIGS. 5, 6 and 7 for use in the peak suppression apparatus 101 according to the first embodiment exemplified by FIG. 3.

Note that the respective algorithms shown in FIGS. 5, 6 and 7 can be independently used as described above, they can be used for a selection of a peak suppression at the suppression method selection unit 170 in a manner of combining these conditions.

TABLE 1

| Characteristic information | Judgment logic | Rationale |
|---|---|---|
| (Length of a peak) 300, 320 | Width < N (constant) . . . Clipping; width ≧ N . . . Window function | Suppress a short peak by the clipping, because a use of the window function for a short peak degrades a reception characteristic. |
| (Inclination of a peak) 400, 420 | Up > a (positive constant) and down < b (negative constant) . . . Clipping; Others . . . Window function | If a peak of a larger amplitude compared to a time width is suppressed by the window function, parts other than the peak is greatly reduced so as to degrade a reception characteristic, and therefore such a peak is suppressed by the clipping |
| (Integration of a peak) 500, 520 | integral < a (positive constant) . . . Clipping; integral ≧ a . . . Window function | An integral being large means that a use of the clipping greatly degrades a spectrum characteristic, and therefore the window function is used in such a case. |

Second Embodiment

The next description is of the case of changing a window width in a peak suppression method using the window function.

Figure 11:
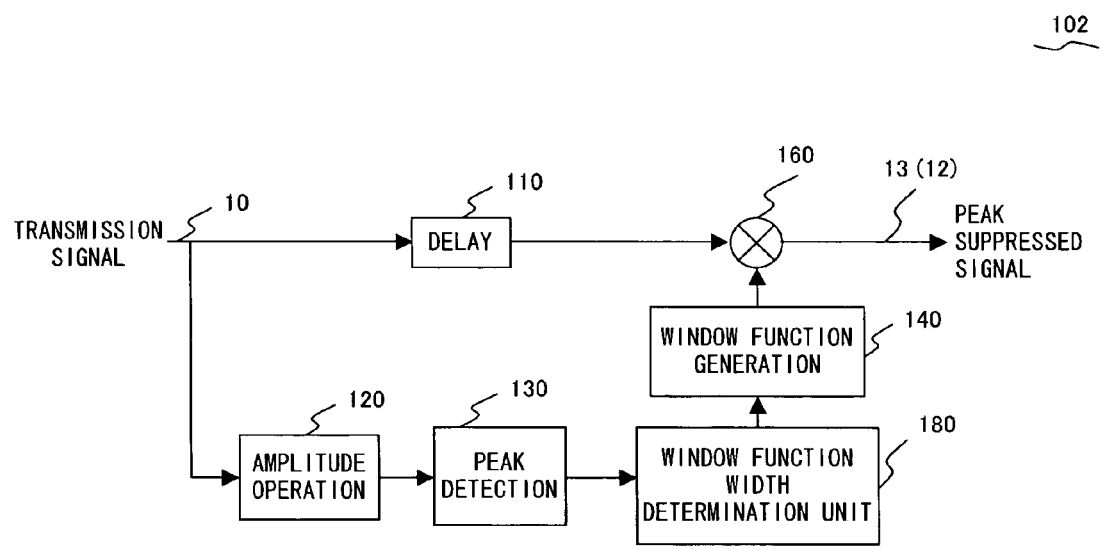
FIG. 11 is a conceptual diagram showing a modified example of configuration of a peak suppression apparatus embodying a peak suppression method according to an embodiment of the present invention.

FIG. 11 is a block diagram exemplifying a configuration of a peak suppression apparatus 102 according to the present second embodiment.

Where the configuration shown by FIG. 11 differs from the configuration example shown by the above described FIG. 3 is that the former uses the window function generation unit 140 independently and also is equipped with a window function width determination unit 180 for controlling a window width in the aforementioned window function generation unit 140.

The window function width determination unit 180 variably controls a width W (refer to FIG. 4) of the window function at the window function generation unit 140 based on characteristic information 10a detected by the peak detection unit 130.

In a peak suppression by the window function, although the larger a width W of a multiplying window function the more a spectrum characteristic is improved, many components of the transmission signal 10 is shaved off as that much, thereby degrading a reception characteristic.

Therefore, it is possible to make a right balance between a spectrum characteristic of the peak suppressed signal 13 and a reception characteristic by the window function width determination unit 180 adaptively changing a width W of the window function multiplying the transmission signal at the multiplication unit 160 according to the characteristic information 10a as shown in the configuration example of FIG. 11.

That is, a window width W of the window function is determined by the window function width determination unit 180 exemplified in FIG. 11 based on the characteristic information 10a of the transmission signal 10 obtained from the peak detection unit 130 at the front stage.

An algorithm for determining a window width W can utilize a peak width, a rise inclination up and a fall inclination down, and an integral of amplitudes integral which are obtained by the respective processes shown in FIGS. 5, 6 and 7 as the same as in the case of the above described first embodiment.

That is, a plurality of methods exemplified summarily in the table 2 can be considered as criteria for changing the width in determining a suppression method shown in FIGS. 5, 6 and 7. These determination methods for a window width W can be used independently and also used by the window function width determination unit 180 in a manner of combining the conditions.

TABLE 2

| Characteristic information | Judgment logic | Rationale |
|---|---|---|
| (Length of a peak) 300, 330 | Window width = width * a (positive constant) + b (constant) | A window width is determined proportionately to the width of a peak so as to avoid an extraneous suppression. |
| (Inclination of a peak) 400, 430 | Window width = (a(pos. constant))/(up * (−down) (constant)) + b | A narrow width window brings moderate suppression by a fact that the steeper the peak rises the narrower the width of a peak is. |
| (Integration of a peak) 500, 530 | Window width = integral * a (positive constant) + b (constant) | A window width is determined proportionately to an integral by using a fact that the larger an integral is the larger the width of a peak is. |

That is, in the case of the flow chart shown by FIG. 5, the window function width determination unit 180 carries out the step 330 (i.e., a determination operation) of the table 2 in place of the above described step 320, thereby determining a window width W and outputting it to the window function generation unit 140.

That is, the window function width determination unit 180 calculates the window width W by the expression W=width*a+b, where "a" is a positive integer and b is a constant.

The step 330 determines a window width W in a manner of being proportionate with a peak width, thereby avoiding an extraneous suppression.

Likewise in the flow chart shown in FIG. 6, the window function width determination unit 180 carries out the step 430 (i.e., a determination operation) shown in the table 2 in place of the above described step 420, that is, calculates a window width W by the expression W=a/(up*(−down))+b, where "a" is a positive integer and b is a constant.

The step 430 uses a window function having a narrow width W by utilizing the fact that the steeper rise of a peak the narrower the peak width, thereby avoiding an excessive suppression.

Likewise in the flow chart shown by FIG. 7, the window function width determination unit 180 carries out the step 530 (i.e., a determination operation) shown in the table 2 in place of the above described step 520, that is, calculates a window width W by the expression W=integral*a+b, where "a" is a positive integer and b is a constant.

The step 530 determines a window width W in a manner of being proportionate with an integral (integral) by utilizing a possibility that the larger an integral (integral) of amplitudes the larger a peak width is.

Third Embodiment

The next description is of the case of controlling a plurality of window function methods.

Figure 12:
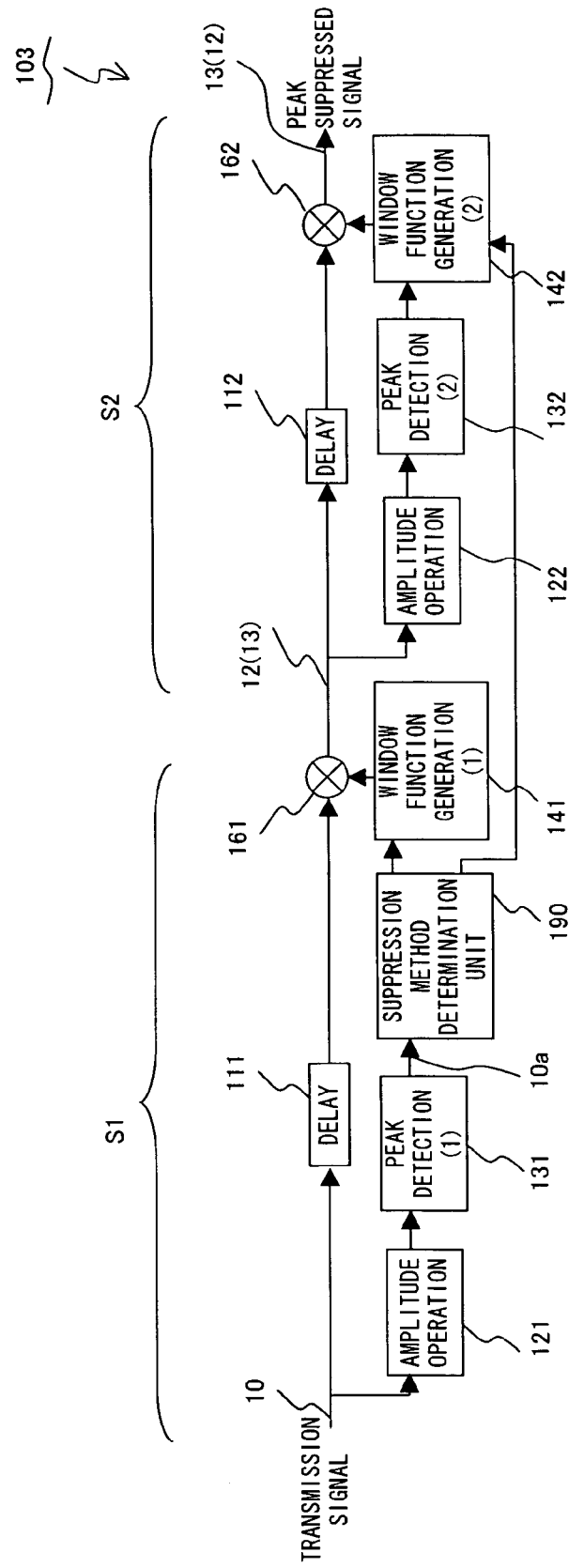
FIG. 12 is a conceptual diagram showing another modified example of configuration of a peak suppression apparatus embodying a peak suppression method according to an embodiment of the present invention.

FIG. 12 is a block diagram exemplifying a configuration of a peak suppression apparatus 103 according to the third embodiment.

The peak suppression apparatus 103 comprises a peak suppression stage S1 including a delay buffer 111, a multiplication unit 161, an amplitude operation unit 121, a peak detection unit 131, a suppression method determination unit 190 and a window function generation unit 141; and a peak suppression stage S2 including a delay buffer 112, a multiplication unit 162, an amplitude operation unit 122, a peak detection unit 132 and a window function generation unit 142.

The delay buffer 111 and delay buffer 112, the multiplication unit 161 and multiplication unit 162, the amplitude operation unit 121 and amplitude operation unit 122, the peak detection unit 131 and peak detection unit 132, and the window function generation unit 141 and window function generation unit 142 respectively have the same functions as the above described delay buffer 110, multiplication unit 160, amplitude operation unit 120, peak detection unit 130 and window function generation unit 140.

Except that the window function generation unit 141 and window function generation unit 142 generates different widths W of window functions, with the width W1 of the window function generation unit 141 and the width W2 of the window function generation unit 142 being in the relation of W1>W2 as exemplified in FIG. 4.

A use of a window function for suppressing a large and narrow peak generally suppresses more extraneously in more peripheral parts of the window function, bringing in a degradation of a reception characteristic, although the suppression is adequate in the neighborhood of the peak. Contrarily, if a window width is narrowed in fear of degradations in peripheral parts, a spectrum characteristic is degraded.

The present third embodiment partially performs a multiplication of a window function in a plurality of times (e.g., two times, i.e., once in the peak suppression stage S1 and once in the peak suppression stage S2 in the example shown by FIG. 12), with the width W2 of the window function for a suppression in the peak suppression stage S2 at the later stage being made smaller than the width W1 of the window function in the peak suppression stage S1 as shown by FIG. 12, thereby making it possible to limit an overall degradation of the spectrum characteristic due to a suppression.

In the case of suppressing the peak part 10p partially in two stages, that is, in the peak suppression stage S1 and peak suppression stage S2 according to a determination of the suppression method determination unit 190 exemplified in FIG. 12, the window function generation unit 141 multiplies the maximum peak part (i.e., a suppression coefficient) by a window function with a k1 times (where k1>1) rather than a normal suppression window, followed by suppressing the remaining peak by using the window function generation unit 142.

That is, the window function generation unit 141 of the peak suppression stage S1 suppresses so that the maximum peak level Vp of the peak part 10p becomes slightly larger than a suppression threshold value Vth, in lieu of suppressing the aforementioned Vp to the target suppression threshold value Vth, followed by the later stage window function generation unit 142 suppressing to the suppression threshold value Vth.

Comparably, in the case of suppressing only in one stage, i.e., the peak suppression stage S1, the suppression method determination unit 190 makes the window function generation unit 141 perform a normal suppression and the window function generation unit 142 outputs "1" as a suppression coefficient to the multiplication unit 162.

Such controls of the operations of the window function generation unit 141 and window function generation unit 142 corresponding to each of the cases, i.e., a two-part peak suppression in the two stages, and one peak suppression in one stage, which are determined by the suppression method determination unit 190, enable an improvement of a reception characteristic.

A selection of the number of stages for suppressing a peak, i.e., two stages or one stage, uses the algorithms shown in the flow charts of FIGS. 5, 6 and 7 as in the case of the above described first embodiment.

Criteria as shown in the Table 3 can be considered as that for using or not using the second stage window function in determining a suppression method shown in FIGS. 5, 6 and 7. These methods can be used individually independently or in a manner of combining these conditions.

TABLE 3

| Characteristic information | Judgment logic | Rationale |
|---|---|---|
| (Length of a peak) 300, 340 | Width < N (constant) . . . use; width ≧ N . . . not use | A short peak is suppressed by the window function whose rear stage is narrow because a suppression of short peaks at once degrades a reception characteristic in peripheral part of the window function. |
| (Inclination of a peak) 400, 440 | Up > a (positive constant) and down < b (negative constant) . . . use; others . . . not use | If a peak of a larger amplitude compared to a time width is suppressed by the window function at once, parts other than the peak is greatly reduced so as to degrade a reception characteristic, and therefore such a peak is suppressed by the window function whose rear stage is narrow. |
| (Integration of a peak) 500, 540 | Integral < a (positive constant) . . . use; integral ≧ a . . . not use | If an integral is small, making a high possibility of a peak width being small, the window function whose rear stage is narrow is also used. |

That is, the third embodiment is configured to carry out a judgment process of the step 340 in place of the step 320 in the above described flow chart shown by FIG. 5.

Figure 13:
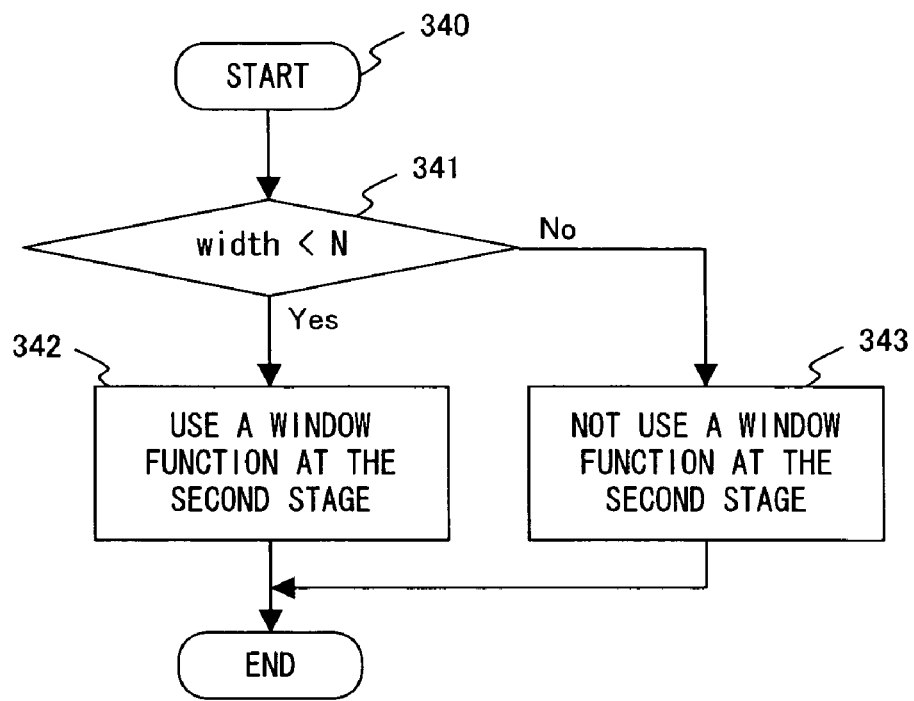
FIG. 13 is a flow chart exemplifying an operation of a suppression method selection unit in the peak suppression apparatus exemplified in FIG. 12.

In the step 340, if a peak width is smaller than a constant N (step 341), the process controls so as to use the window function generation unit 142 of the peak suppression stage S2 (step 342), otherwise not use the window function generation unit 142 (step 343) as shown in FIG. 13.

The reason is that a suppression of a short peak at once degrades a reception characteristic in the peripheral parts of a window function and therefore such a peak is suppressed by a narrow window function at the later stage.

Likewise, the flow chart shown by FIG. 6 carries out the step 440 in place of the step 420.

Figure 14:
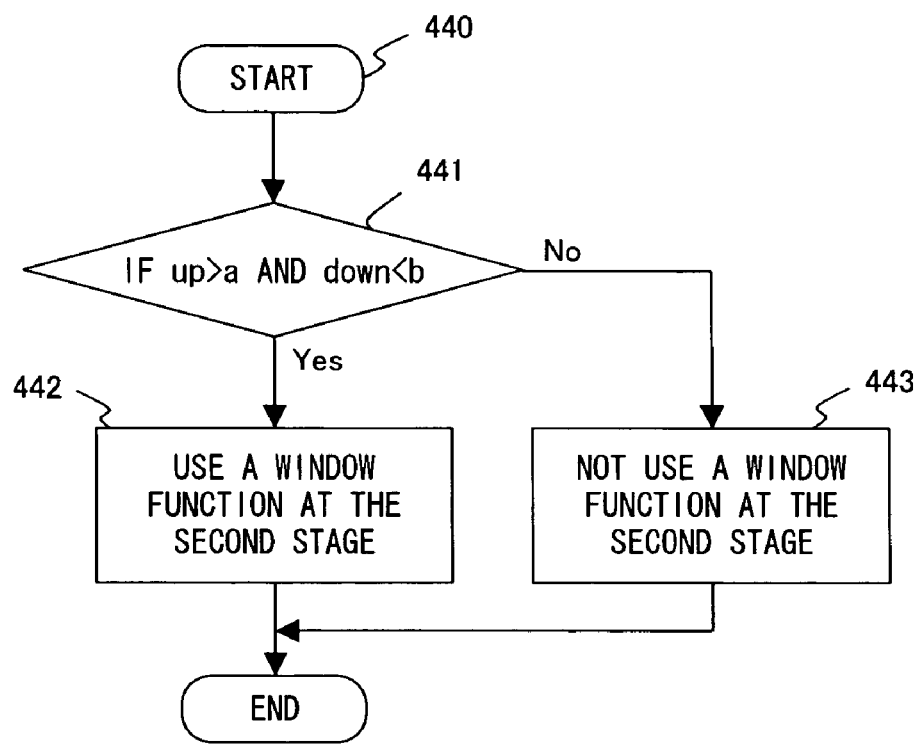
FIG. 14 is a flow chart exemplifying an operation of a suppression method selection unit in the peak suppression apparatus exemplified in FIG. 12.

The step 440, if a rise inclination up is larger than a constant "a" and also a fall inclination down is smaller than a constant b (where b is a negative number) (step 441), the process uses the window function generation unit 142 of the peak suppression stage S2 (step 442), otherwise does not use the window function generation unit 142 (step 443) as exemplified in FIG. 14.

The reason is that a suppression of a peak having a larger amplitude compared to a time width at once by the window function degrades a reception characteristic as a result of greatly shaving off the parts other than the peak and therefore such a peak is suppressed by a narrow window function at the later stage.

Likewise, the flow chart shown by FIG. 7 carries out a step 540 in place of the step 520.

Figure 15:
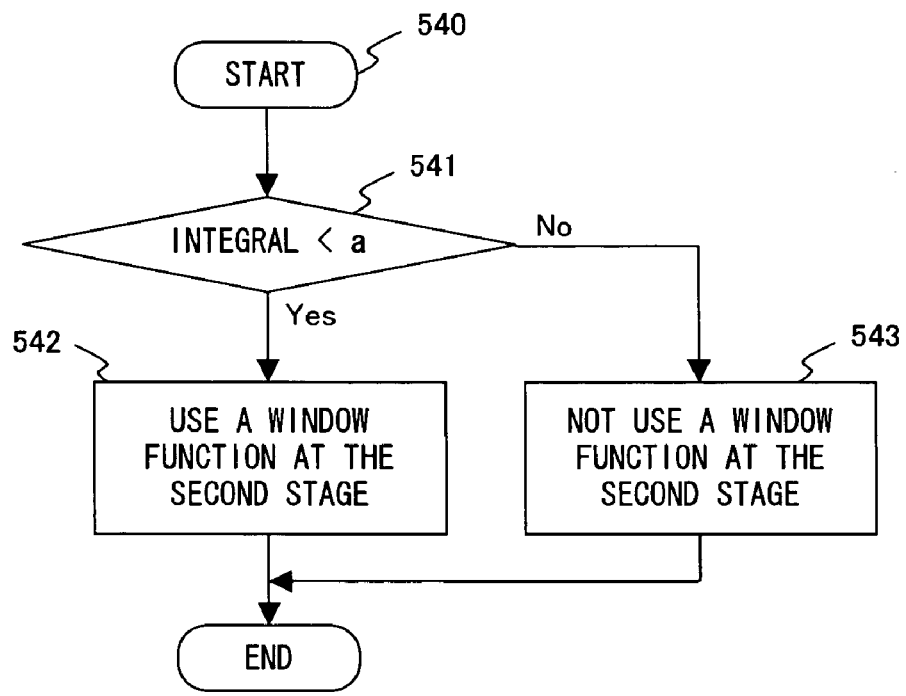
FIG. 15 is a flow chart exemplifying an operation of a suppression method selection unit in the peak suppression apparatus exemplified in FIG. 12.

The step 540, if an integral integral of an amplitude is smaller than a constant "a" (step 541), uses the window function generation unit 142 of the peak suppression stage S2 (step 542), otherwise does not use the window function generation unit 142 (step 543) as exemplified in FIG. 15.

That is, if there is a high possibility of an integral being small and therefore the peak width being small, the process also uses a narrow window function of the window function generation unit 142 at the later stage.

Fourth Embodiment

The next description is of the case of controlling the clip coefficient calculation unit 150 of the clipping suppression method and the window function generation unit 140 of the window function method by placing them in series, as the fourth embodiment.

Figure 16:
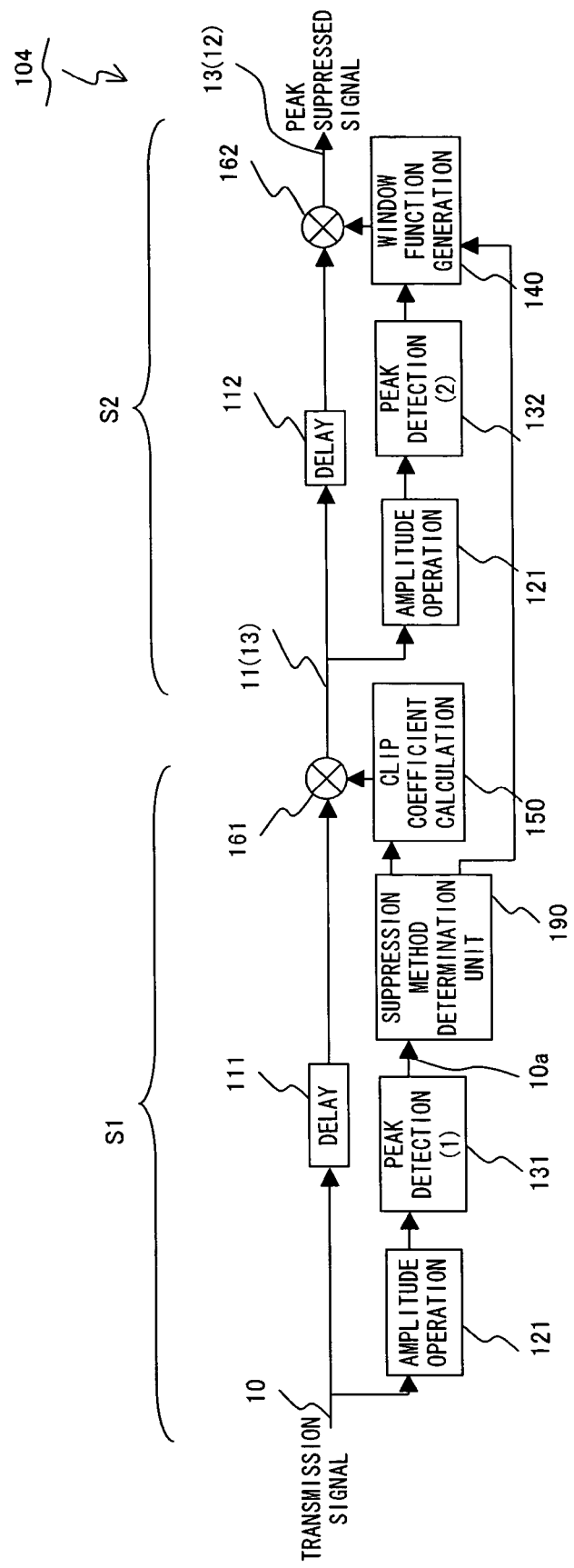
FIG. 16 is a conceptual diagram showing yet another modified example of configuration of a peak suppression apparatus embodying a peak suppression method according to an embodiment of the present invention.

FIG. 16 is a block diagram exemplifying a configuration of a peak suppression apparatus 104 according to the present fourth embodiment.

The peak suppression apparatus 104 is configured to equip a clip coefficient calculation unit 150 in place of the window function generation unit 141 of the peak suppression stage S1 for the peak suppression apparatus 103 exemplified by the above described FIG. 12, and equip a window function generation unit 140 in place of the window function generation unit 142 of the peak suppression stage S2.

This exemplifies the case of using a window function method of the window function generation unit 140 by changing over because a great suppression of a peak only by the clipping suppression method by the clip coefficient calculation unit 150 in the peak suppression apparatus 101 according to the first embodiment degrades a spectrum characteristic.

Comparably, the peak suppression apparatus 104 according to the present fourth embodiment is configured to equip the clip coefficient calculation unit 150 using the clipping suppression method in the peak suppression stage S1 and equip the window function generation unit 140 using the window function in the peak suppression stage S2, the same as the above described FIG. 16, thereby carrying out a peak suppression in series.

And the suppression method determination unit 190 controls whether carrying out the peak suppression in two stages by using both the clip coefficient calculation unit 150 and window function generation unit 140 or carrying out one in one stage by using only the clip coefficient calculation unit 150 as follows.

In the case of carrying out the two-part peak suppression in two stages, i.e., the peak suppression stage S1 and peak suppression stage S2 under the control of the suppression method determination unit 190 exemplified in FIG. 16, the clip coefficient calculation unit 150 sets a clip threshold value at larger than the target suppression threshold value Vth for suppressing a suppression width W3, followed by suppressing the remaining peak in the window function generation unit 140 at the later stage.

Meanwhile, in the case carrying out the suppression in only one stage, the clip coefficient calculation unit 150 in the first peak suppression stage S1 carries out a normal suppression (i.e., setting the clip threshold value at a target suppression threshold value Vth), and the window function generation unit 140 outputs a constant k=1 independent of n to the multiplication unit 162.

Such a control at the peak suppression apparatus 104 enables an appropriate adjustment of a reception characteristic and a spectrum characteristic.

Whether to use two stages or one stage of the number of stages for the peak suppression is selected by using algorithm (i.e., steps 350, 450 and 550) shown in the flow charts of the above described FIGS. 5, 6 and 7.

In the respective steps 350, 450 and 550 shown in FIGS. 5, 6 and 7, the criteria for determining a use or not use of the window function generation unit 140 at the second stage can be considered as summarily exemplified by the Table 4. A determination method for these steps 350, 450 and 550 can be used individually independently or in a manner of combining each condition.

TABLE 4

| Characteristic information | Judgment logic | Rationale |
| --- | --- | --- |
| (Length of a peak) 300, 350 | Width < N (constant) ... not use; width ≧ N ... use | If a long peak is suppressed only by the clip, a spectrum characteristic is degraded, and therefore the window function system is parallelly used. |
| (Inclination of a peak) 400, 450 | Up > a (positive constant) and down < b (negative constant) ... not use; others ... use | If a peak with a large time width is suppressed only by the clip, a spectrum characteristic is degraded, and therefore the window function system is parallelly used. |
| (Integration of a peak) 500, 550 | Integral < a (constant) ... not use; integral ≧ a ... use | If an integral is large, a suppression only by the clip degrades a spectrum characteristic greatly, and therefore the window function is parallelly used. |

That is, in the step 350 shown in FIG. 5, if a peak width width is smaller than a constant N (step 351), the process does not use the window function generation unit 140 at the second stage (step 352), otherwise uses the window function generation unit 140 at the second stage (step 353) as exemplified by the flow chart shown in FIG. 17.

The reason is that the suppression of a long peak by a clipping suppression method of the clip coefficient calculation unit 150 degrades a spectrum characteristic and therefore a window function method of the window function generation unit 140 is parallelly used.

In the step 450 shown in FIG. 6, if a rise inclination up is larger than a constant a and also a fall inclination down is smaller than b (which is a negative value) (step 451), the process does not use the window function generation unit 142 in the peak suppression stage S2 (step 452), otherwise use the window function generation unit 142 (step 453) as exemplified in the flow chart shown by FIG. 18.

The reason is that if a peak with a large time width is suppressed only by the clipping method, a spectrum characteristic is degraded, and therefore the window function is parallelly used.

Figure 19:
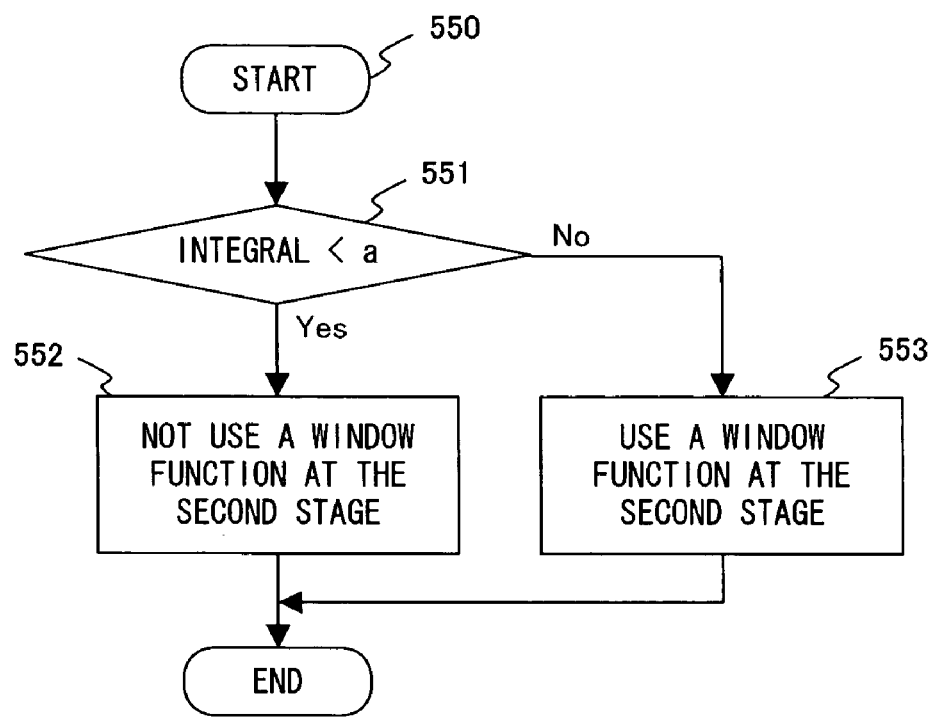
FIG. 19 is a flow chart exemplifying an operation of a suppression method selection unit in the peak suppression apparatus exemplified in FIG. 16.

Meanwhile in the step 550 shown in FIG. 7, if an integral of an amplitude integral is smaller than a constant "a" (step 551), the process does not use the window function generation unit 140 at the second stage (step 552), otherwise uses the window function generation unit 140 threat, as exemplified in the flow chart shown by FIG. 19.

The reason is that, if the integral is large, the suppression by using only the clipping method greatly degrades a spectrum characteristic and therefore the window function is parallelly used.

As described above, the peak suppression apparatuses 101 through 104 according to the present first through fourth embodiments bring forth benefits as follows:

A use of various kinds of characteristic information 10a of a peak part 10p obtained from a transmission signal 10 rather than only a usual value of amplitude of the aforementioned transmission signal 10 enables a dynamic control of a peak suppression method, and hence enables an appropriate peak suppression considering a balance between a reception characteristic and a spectrum characteristic (i.e., a distortion characteristic).

An application of both a window function method and a clipping suppression method enables a good balance of benefits provided by the window function method, i.e., a good distortion characteristic, and by the clipping suppression method, i.e., a good reception characteristic.

A confirmed fact by using a simple simulation is that an Error Vector Magnitude (EVM), which is a scale of difference between an (ideal) waveform and a measured waveform, can be improved from 4.5% to 4.0% as compared to a single use of a window function method if a degradation of an Adjacent Channel Leak Ratio (ACLR) of 3 dB to 4 dB is tolerated.

Fifth Embodiment

The next description is of the case of applying the peak suppression apparatuses 101 through 104, which are exemplified in the above described respective embodiments, to a wireless telecommunication apparatus 200.

Figure 20:
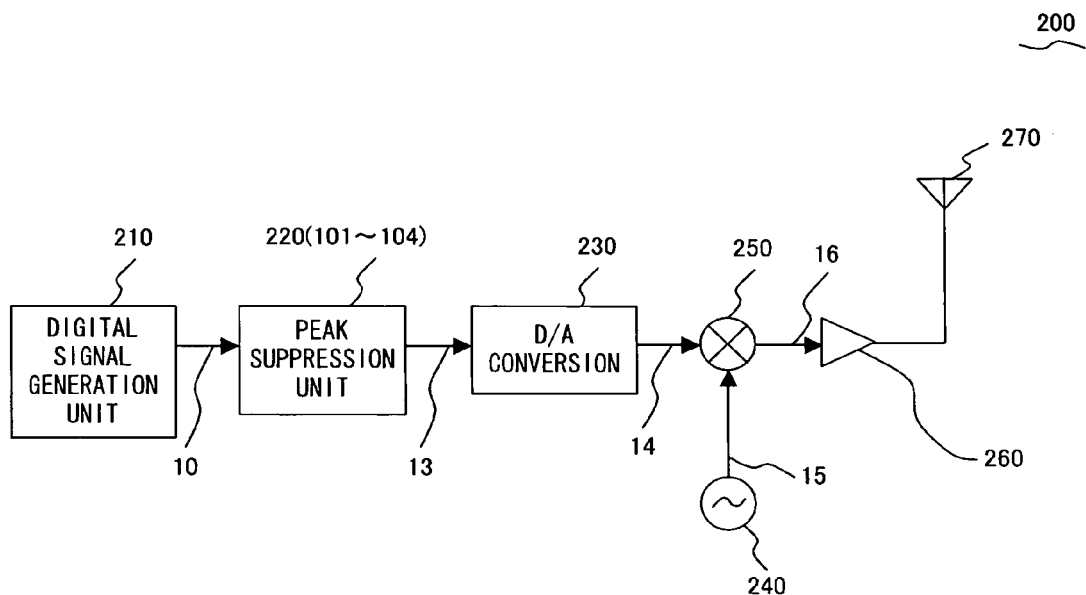
FIG. 20 is a block diagram exemplifying a configuration of a wireless telecommunication apparatus according to an embodiment of the present invention.

FIG. 20 is a block diagram exemplifying a configuration of a wireless telecommunication apparatus 200 according to an embodiment of the present invention.

The wireless telecommunication apparatus 200 according to the present embodiment includes a digital signal generation unit 210, a peak suppression unit 220, a D/A (digital-to-analog) conversion unit 230, a high-frequency generation unit 240, a high-frequency conversion unit 250, a transmission amplifier 260 and a transmission antenna 270.

The digital signal generation unit 210, being a digital modulation unit for use in a multi-carrier telecommunication such as an Orthogonal Frequency Division Multiple Access (OFDM), for example, applies a digital modulation to transmission data and outputs it as a transmission signal 10.

The peak suppression unit 220 carries out a peak suppression to the transmission signal 10 and outputs it as a peak suppressed signal 13. The present fifth embodiment is configured to use either one of the peak suppression apparatuses 101 through 104 which are exemplified in the above described first through fourth embodiments.

The D/A conversion unit 230 converts the peak suppressed signal 13 into an analog signal 14.

The high-frequency generation unit 240 generates a high-frequency signal 15 in a wireless transmission frequency.

The high-frequency conversion unit 250 generates a high-frequency radio signal 16 by superimposing the high-frequency signal 15 generated by the high-frequency generation unit 240 with the above described analog signal 14.

The transmission amplifier 260 amplifies the high-frequency radio signal 16.

The transmission antenna 270 emits the high-frequency radio signal 16 into the air.

The present fifth embodiment is configured to adopt either of the above described peak suppression apparatuses 101 through 104 as the peak suppression unit 220, thereby carrying out an adaptive peak suppression by the window function generation unit 140 and/or clip coefficient calculation unit 150 based on characteristic information 10a of the transmission signal and outputting a peak suppressed signal 13 for which a balance between a reception characteristic and a distortion characteristic is optimized.

As a result, a reduction of a peak-to-average power ratio (PAPR) for the peak suppressed signal 13 enables an operation of the transmission amplifier 260 in a linear range without requiring an unnecessarily large back-off power of the transmission amplifier 260, and an improvement of an operation efficiency thereof. In other words, it enables reductions of a cost and a power consumption for the wireless telecommunication apparatus 200.

The present fifth embodiment also carries out an adaptive peak suppression for the transmission signal 10 and outputs a peak suppressed signal 13 by well optimizing the balance between a reception characteristic and a distortion characteristic, thereby enabling an accomplishment of an optimization of the balance between the reception characteristic and distortion characteristic for the peak suppressed signal 13 corresponding to characteristics of transmission signals 10 provided by various modulation methods for use in the digital signal generation unit 210 comprised by the wireless telecommunication apparatus 200.

Note that the present invention can apparently be changed in various ways possible within the scope thereof in lieu of being limited by the configurations exemplified in the above described embodiments.

The present invention minimizes a peak-to-average power ratio (PAPR) of a transmission signal, thereby enabling a reduction of an output back-off of a transmission amplifier and an improvement of amplification efficiency.

It also enables a minimization of a peak-to-average power ratio (PAPR) of a transmission signal while effectively adjusting a balance of degradation between a reception characteristic and a distortion characteristic due to a peak suppression.

It also enables an accomplishment of an optimization of a balance between a reception characteristic and a distortion characteristic for a peak suppressed signal of a transmission signal corresponding to characteristics of transmission signals by various modulation methods used for a wireless telecommunication apparatus.

What is claimed is:

1. A peak suppression method, including:
   using a peak detection unit to detect characteristic information of a peak part of a transmission signal; and
   using a peak suppression control unit to control a suppression method for the peak part based on the characteristic information,
   the characteristic information including at least one of a continuous length of the peak part, inclinations of a rise and a fall of the peak part, and an integral of the peak part, wherein
   the peak suppression control unit uses a window function method that suppresses the peak part by using a window function and a clipping method that suppresses the peak part by limiting an upper limit of a signal level of the peak part to a predetermined value, the peak suppression control unit changing between the window function method and the clipping method dynamically using a comparison result between at least one of the characteristic information and a certain threshold value.

2. The peak suppression method according to claim 1, wherein
   a width of the window function is changed according to the characteristic information.

3. The peak suppression method according to claim 1, wherein
   detecting of the characteristic information and controlling of the suppression method are carried out in multiple stages for the transmission signal.

4. A peak suppression method, including:
   using a peak detection unit to detect a characteristic information of a peak part of a transmission signal; and
   using a peak suppression control unit to control a suppression method for the peak part based on the characteristic information,
   the characteristic information including at least one of a continuous length of the peak part, inclinations of a rise and a fall of the peak part, and an integral of the peak part, wherein
   detecting of the characteristic information and controlling of the suppression method are carried out in multiple stages for the transmission signal, and the peak suppression control unit of a first stage uses a clipping method that suppresses the peak part by limiting an upper limit of a signal level of the peak part to a predetermined value, while the peak suppression control unit of a next stage uses a window function method that suppresses the peak part by using a window function, and
   a suppression method selection unit selects either the clipping method or the window function method by changing between the window function method and the clipping method dynamically using a comparison result between at least one of the characteristic information and a certain threshold value.

5. The peak suppression method according to claim 1, wherein
   the peak detection unit detects the continuous length of said the peak part as the characteristic information.

6. The peak suppression method according to claim 1, wherein
   the peak detection unit detects the inclinations of a rise and a fall of the peak part as the characteristic information.

7. The peak suppression method according to claim 1, wherein
   the peak detection unit detects the integral of the peak part as the characteristic information.

8. A peak suppression apparatus, comprising:
   a peak detection unit detecting characteristic information of a peak part of a transmission signal; and
   a peak suppression control unit changing a suppression method for the peak part using the characteristic information,
   the characteristic information including at least one of a continuous length of the peak part, inclinations of a rise and a fall of the peak part, and an integral of the peak part, wherein
   the peak suppression control unit uses a window function method that suppresses the peak part by using a window function and a clipping method that suppresses the peak part by limiting an upper limit of a signal level of the peak part to a predetermined value, the peak suppression control unit changing between the window function method and the clipping method dynamically using a comparison result between at least one of the characteristic information and a certain threshold value.

9. The peak suppression apparatus according to claim 8, wherein
a width of the window function is changed according to said the characteristic information.

10. The peak suppression apparatus according to claim 8, wherein
the peak detection unit and peak suppression control unit are placed in multiple stages along a transmission path of the transmission signal.

11. A peak suppression apparatus, comprising:
a peak detection unit detecting characteristic information of a peak part of a transmission signal; and
a peak suppression control unit changing a suppression method for the peak part based on the characteristic information,
the characteristic information including at least one of a continuous length of the peak part, inclinations of a rise and a fall of the peak part, and an integral of the peak part, wherein
the peak detection unit and peak suppression control unit are placed in multiple stages along a transmission path of the transmission signal, and the peak suppression control unit of a first stage uses a clipping method that suppresses the peak part by limiting an upper limit of a signal level of the peak part to a predetermined value, while the peak suppression control unit of a next stage uses a window function method that suppresses the peak part by using a window function, and
a suppression method selection unit selects either the clipping method or the window function method by changing between the window function method and the clipping method dynamically using a comparison result between at least one of the characteristic information and a certain threshold value.

12. The peak suppression apparatus according to claim 8, wherein
the peak detection unit detects the continuous length of the peak part as the characteristic information.

13. The peak suppression apparatus according to claim 8, wherein
the peak detection unit detects the inclinations of a rise and a fall of the peak part as the characteristic information.

14. The peak suppression apparatus according to claim 8, wherein
the peak detection unit detects the integral of the peak part as the characteristic information.

15. A wireless transmission apparatus, including:
a transmission signal generation unit to generate a transmission signal;
a peak suppression unit to suppress a peak part of the transmission signal;
an amplifier unit to amplify the transmission signal whose peak has been suppressed; and
a wireless transmission unit to convert the aforementioned transmission signal to a radio frequency, wherein
the peak suppression unit includes
a peak detection unit to detect characteristic information of a peak part of a transmission signal, and
a peak suppression control unit to change a suppression method for the peak part using the characteristic information,
the characteristic information including at least one of a continuous length of the peak part, inclinations of a rise and a fall of the peak part, and an integral of the peak part, wherein
the suppression method includes at least either a window function method that suppresses the peak part by using a window function or a clipping method that suppresses the peak part by limiting an upper limit of a signal level of the peak part to a predetermined value, the suppression method changing between the window function method and the clipping method dynamically using a comparison result between at least one of the characteristic information and a certain threshold value.

16. The wireless transmission apparatus according to claim 15, wherein
the peak detection unit and peak suppression control unit are placed, within the peak suppression unit, in multiple stages along a transmission path of the transmission signal.

* * * * *